(12) United States Patent
Elmedyb et al.

(10) Patent No.: US 7,925,031 B2
(45) Date of Patent: Apr. 12, 2011

(54) AUDIO SYSTEM WITH FEEDBACK DETECTION MEANS

(75) Inventors: Thomas Bo Elmedyb, Smørum (DK); Johan Hellgren, Smørum (DK)

(73) Assignee: Oticon A/S, Smorum (DK)

( * ) Notice: Subject to any disclaimer, the term of this patent is extended or adjusted under 35 U.S.C. 154(b) by 1155 days.

(21) Appl. No.: 11/409,991

(22) Filed: Apr. 25, 2006

(65) Prior Publication Data

US 2006/0266202 A1 Nov. 30, 2006

(30) Foreign Application Priority Data

Apr. 27, 2005 (EP) .................... 05103454

(51) Int. Cl.
*H04B 15/00* (2006.01)
*H04R 27/00* (2006.01)
*H04R 3/00* (2006.01)
*H04R 25/00* (2006.01)
*H03F 99/00* (2009.01)

(52) U.S. Cl. ............... 381/93; 381/83; 381/95; 381/96; 381/121; 381/318

(58) Field of Classification Search ............... 381/93, 381/95, 96, 101, 318, 83, 121
See application file for complete search history.

(56) References Cited

U.S. PATENT DOCUMENTS

| 4,905,290 A | 2/1990 | Yaoita |
| 2005/0047620 A1 | 3/2005 | Fretz |
| 2005/0226447 A1* | 10/2005 | Miller, III ............... 381/318 |

FOREIGN PATENT DOCUMENTS

| DE | 197 48 079 A1 | 5/1999 |
| WO | WO-2004/105429 A1 | 12/2004 |
| WO | WO-2004/105430 A1 | 12/2004 |

* cited by examiner

*Primary Examiner* — Vivian Chin
*Assistant Examiner* — George Monikang
(74) *Attorney, Agent, or Firm* — Birch, Stewart, Kolasch & Birch, LLP

(57) ABSTRACT

The invention concerns an audio system comprising a microphone, audio signal processing means, an output transducer and mans for detecting a possible feedback tone and the corresponding frequency of the feedback tone in the audio system between the output transducer and the microphone. According to the invention means for counteracting feedback are provided. Further, mans are provided for changing the phase of the audio signal at a given frequency.

16 Claims, 2 Drawing Sheets

AUDIO SYSTEM WITH FEEDBACK DETECTION MEANS

AREA OF THE INVENTION

The invention regards an audio system comprising a microphone, an audio signal processing means and an output transducer where the signal processing means comprises a detector for detecting the state of feedback in the audio system between the output transducer and the microphone.

BACKGROUND OF THE INVENTION

Feedback usually generates a loud howling sound in the output transducer. Detectors which may detect the presence of feed back are used on order to control the development of feed back in feedback cancellation systems where the detection may be used to control the adaptation, e.g. increase adaptation speed at the presence of howl. It is also used in hearing aids without feedback cancellation system as an "online feedback manager". The gain is then reduced at the frequency where howl is detected. The feedback is usually a rather narrow-band and loud signal, and it is not difficult to arrange a detector for such a signal in the signal path, however should a similar signal occur in the environment the detector will react to such a signal as well as to the real feedback signal. The problem to be solved by the invention is to distinguish tones caused by feedback from environmental sounds like tones, e.g. flute or other sounds with a high content of pure tones.

Patent application PCT/2004/000701 describes a method to detect howl that comprises analysis of the phase of the signal in the frequency domain. Successive windows of the input signal are then converted into frequency bands in the frequency domain. The change of phase of successive windows is then compared and if it is constant it is assumed to be caused by howl. The present invention differs from the application PCT/2004/000701 as the present invention modifies the phase of the forward path of the hearing aid and looks for changes in the frequency of the howl that can be expected if the howl is caused by feedback.

Patent application PCT/2004/000702 describes a method to suppress feedback that involves modification of the phase of the forward path. The phase is then modified in a random pattern, in opposite to the present invention that uses a predefined change of the phase. Further, the present invention is a method to detect howl and not to suppress feedback as application PCT/2004/000702.

SUMMARY OF THE INVENTION

The invention provides an audio system having a microphone, audio signal processing means, an output transducer and means for detecting a possible feedback tone and the corresponding frequency of the feedback tone in the audio system between the output transducer and the microphone. Also means for counteracting feedback are provided. According to the invention means are provided for changing the phase of the audio signal at a given frequency. Such a change in phase allows the audio system to detect whether the detected tone is caused by feedback or comes from the outside environment. Thus it becomes possible to more efficiently control the feedback cancellation system. Preferably the audio system of the invention comprises a controller whereby the phase of the audio signal at a frequency is changed whenever the means for detecting a possible feedback in the audio system indicates possible feedback at this frequency and also a comparing unit is provided wherein the frequency of the detected possible feedback tone before and after effecting the change of the phase of the audio signal are compared. If the frequency of the detected possible feedback is not affected by the shift in phase, it is not a feedback tone, but has an origine outside the device. If the controlled change of the phase of the audio signal results in a change in frequency this change is detectable in the comparing unit and will be an indication that feedback is present at this frequency. Hereafter anti-feedback measurements may be turned on or speeded up in order to counteract the feedback.

In an embodiment of the invention an allpass filter is provided for changing the phase of the audio signal, preferably a second order all pass filter. The allpass filter will always have a flat amplitude response while the phase can be changed. This makes it an ideal choice as a phase shifter. It is located in the signal path and is a part of the loop that may be oscillating. The frequency of the howl will be given by the Nyquist criterion and accordingly oscillation will occur at a frequency where the phase of the loop is a multiple of 360 degrees. If the phase in the loop is changed the frequency of the howl will change, and the allpass filter with the changeable phase allows a fast and simple way of changing the phase without otherwise affecting the signal. If the tone is external the frequency will be independent of the phase. That is, no change of frequency will occur when the phase is changed. If the signal detected as howl changes frequency when the phase is changed, then an outside source of this signal can be excluded, and the countermeasures against feedback are turned on.

In an embodiment of the invention the all pass filter has a transfer function of the following general form:

$$H(z) = \frac{a_2 + a_1 z^{-1} + z^{-2}}{1 + a_1 z^{-1} + a_2 z^{-2}}$$

This filter is easy to implement and a minimum of parameters need be changed in order to achieve a change in phase of the signal over a broad range of frequencies.

Preferably means are provided for gradual change of the coefficients $a_1$ and $a_2$. This gradual change will cause a change in phase without causing serious audible artefacts.

The invention also comprises a method for detecting acoustic feedback in an audio system.

DESCRIPTION OF A PREFERRED EMBODIMENT

Figure 1:
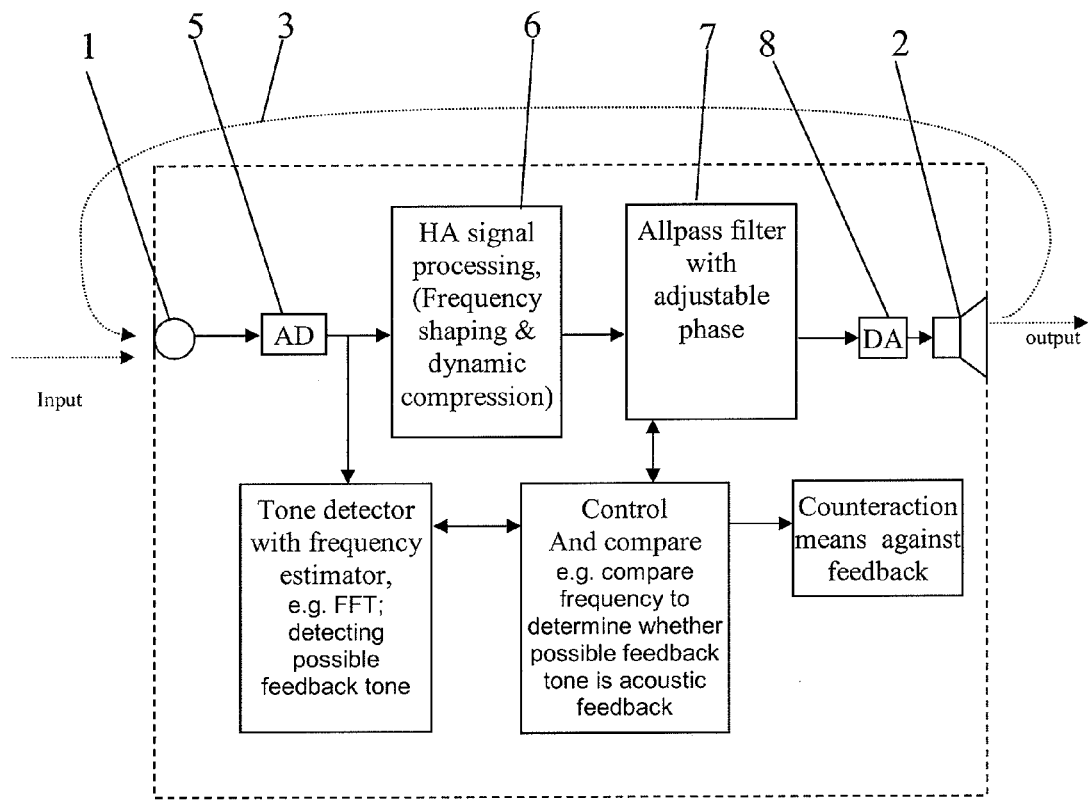
FIG. 1 shows a hearing aid with howl detector that uses allpass filter with adjustable phase to distinguish howl from other tones.

An example of a system according to the invention is shown in FIG. 1. In the example a hearing aid is displayed, but any audio device with a microphone 1, a signal processing means and an output transducer or loudspeaker 2, wherein an acoustic feedback path 3 is present may benefit from the invention. The hearing aid 4 in FIG. 1 further comprises an AD transformer 5, a signal shaping block 6, an allpass filter block 7, and a DA transformer 8. The delay, and thus the phase, in the loop comprising the components in the hearing aid 1, 5, 6, 7, 8, 2 and the acoustic feedback path 3 depends to a large extent on the signal processing in the hearing aid 4. In hearing aids a sample delay in the order of 100 samples (approximately 6 ms) in the loop is not un-common. Accordingly the frequencies where there is potential howl are separated by about 170 Hz. Changing the phase at the frequency of the howl by 180 degrees will cause the frequencies where howl may occur to shift by about 85 Hz. Shifting the phase by 180 degrees will give the greatest shift in howl frequency. If we shift phase more than that, the shift in frequency may be less.

If the processing within the audio processor allows the determination of frequency shifts smaller than 85 Hz the phase change of the suspected feedback tone may be chosen to a different value than 180 degrees. Setting the phase shift to a lower value than 180 degrees could provide other advantages as in the low frequency area the phase change effected on the output when applying the all pass filter to the processed sound may have side effects for the hearing aid user. One side effect is that the perceived directionality of the sound may change, which may be un-comfortable for the user.

A digital allpass filter can be generated with the following transfer function:

$$H(z) = \frac{a_N + a_{N-1}z^{-1} + \ldots + a_1 z^{-N-1} + z^{-N}}{1 + a_1 z^{-1} + a_2 z^{-2} + \ldots + a_N z^{-N}}$$

A second order allpass filter can be designed as follows:

$$H_1(z) = \frac{a_2 + a_1 z^{-1} + z^{-2}}{1 + a_1 z^{-1} + a_2 z^{-2}}$$

Figure 2:
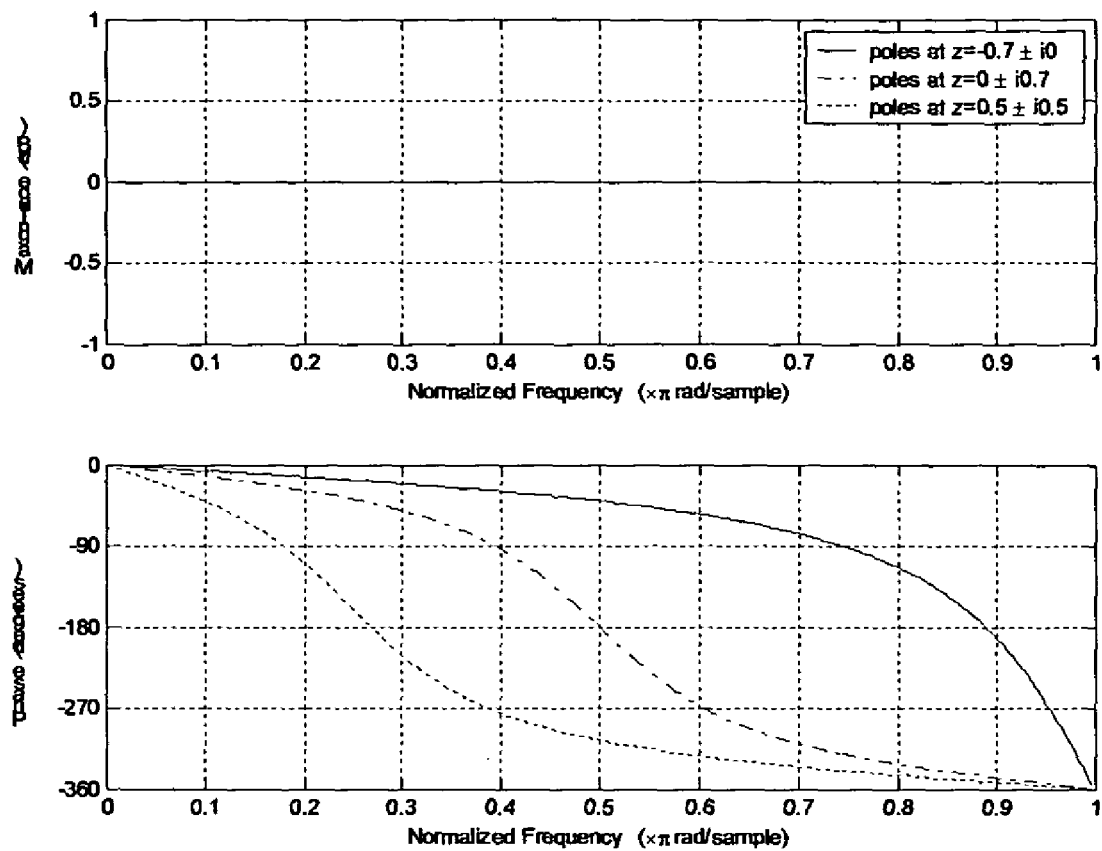
FIG. 2 is three examples of phase responses with three alternative settings of a second order allpass filter.

FIG. 2 shows the amplitude and phase response with three alternative settings of a second order allpass filter. Assume that the setting with poles at $z=-0.7\pm i0$ is used as a default setting. If a suspected howl occurs with a normalized frequency of 0.55 then it will be useful to move the poles to $z=0\pm i0.7$ as this gives a change of the phase response of about 180 degrees at this frequency. If the suspected howl instead have a normalized frequency of 0.29 then it is desirable to move the poles to $z=0.5\pm i0.5$, as this gives about 180 phase shift at this frequency. The coefficients that give the desired phase change at the frequency of interest are easily determined using common filter design tools. The poles and the $a_1$, $a_2$ coefficients are unambiguously interlinked by the $H_1(z)$ function. There may be multiple positions of the pole that give the same phase at the frequency of interest.

The design of the filter $H_1$ amounts to determine the value of the two coefficients $a_1$ and $a_2$ and here a broad range of changes in the phase frequency relationship is realizable, and it is also possible to provide all pass filters where the phase change in the frequency area below 1 kHz is very small, and thus avoid the previously mentioned problems of perceived directionality changes.

Other means for giving a phase shift of the signal at a frequency are available, like a more general digital filter, inversion of the signal or by changing the phase in the frequency domain. An allpass filter is in most cases a good choice as it can change the phase without changing the amplitude response.

Other filters that also give some change in the amplitude response when the phase response is changed could be used, but the change in amplitude response is usually not desired.

The allpass filter 7 could be combined with the filter 6 in the forward path that usually is used to shape the frequency response of the hearing aid. These two filters can be combined into a non-flat filter that can change the phase response without changing the amplitude response.

Inversion of the signal could be achieved by applying a gain that is gradually changing from +1 to −1. This will usually create more audible artefacts than the allpass filter.

An implementation in the frequency domain can be designed as follows: The time domain input signal is converted to the frequency domain by a transform, e.g. fast Fourier transform (FFT). The phase of the particular frequency band corresponding to a suspected feedback howl can then be gradually changed by applying a complex valued band gain with a fixed magnitude but with a gradually changing phase. The phase is changed until the phase at the suspected frequency has changed so much that the frequency change that will occur if the howl is caused by feedback can be expected to be detected. It can be useful to change the phase 180 degrees at the frequency of interest as it can be expected to give the greatest shift in howl frequency. When the phase has been modified to the desired value it is fixed while the occurrence and/or frequency of howl is analysed. Then it can be changed back to the original value. This signal processing can be combined with other types of processing in the frequency domain, e.g. frequency shaping and compression of dynamics. The inverse transform is used to convert the frequency domain signal back to the time domain. The implementation in the frequency domain allows for simultaneous tests of multiple frequencies with suspected howl.

A possible system could use an allpass filter with the displayed response as default. This response is maintained as long as howl is not suspected to be present. When a tone that may be howl is present and detected by the tone detector 10 the coefficients are gradually faded to coefficients that give a 180 degree phase shift at the suspected frequency. The frequencies of the suspected tone before and after the phase shift are then compared and if they have not changed the tone is most likely to have an origin outside the hearing aid and if the frequency has shifted, the tone is most likely to be caused by feedback. In this event a message is transmitted to the means 9 for counteracting the feedback, of the audio device to start up or improve the antifeedback measures.

The invention claimed is:

1. An audio system, comprising: a microphone capturing an audio signal; an audio signal processor; an output transducer; a feedback tone detector which detects a possible feedback tone and a corresponding frequency of the possible feedback tone in the audio system between the output transducer and the microphone; a feedback counteracting unit configured to counteract the feedback; a controller configured to change the phase of the audio signal at a given frequency by a predefined amount of phase change whenever the feedback tone detector detects a possible feedback in the audio system at the given frequency; and a comparator configured to compare the frequency of the detected possible feedback tone before the phase change by the controller, to the frequency of the detected possible feedback tone while the phase of the audio signal is changed by the controller, wherein the controller is further configured to determine whether the possible feedback tone detected by the feedback tone detector is caused by acoustic feedback based on a comparison result of the comparator, the controller is further configured to change the phase of the audio signal back to its original value after the controller completes the determination of whether the possible feedback tone is caused by acoustic feedback.

2. The audio system as claimed in claim 1, wherein the controller comprises an all pass filter.

3. Audio system as claimed in claim 2, wherein the all pass filter has a transfer function of the following general form:

$$H(z) = \frac{a_2 + a_1 z^{-1} + z^{-2}}{1 + a_1 z^{-1} + a_2 z^{-2}}.$$

4. Audio system as claimed in claim 3, wherein means are provided for gradual change of the coefficients $a_1$ and $a_2$.

5. The audio system according to claim 2, wherein the all pass filter is a second order all pass filter.

6. The audio system according to claim 1, wherein the predefined amount of phase change at the given frequency is 180 degrees.

7. The audio system according to claim 1, further comprising:
a time domain to frequency domain transformation unit.

8. The audio system according to claim 1, wherein the controller is configured to gradually change the phase of the given frequency band corresponding to a possible feedback howl by applying a complex valued frequency band gain with a fixed magnitude and with a gradually changing phase.

9. A method for detecting acoustic feedback in an audio system, comprising: capturing an audio signal by a microphone; processing the audio signal in an audio processor; serving the processed audio signal at an output transducer; detecting a possible feedback tone along with a corresponding frequency of the possible feedback tone in the audio system between the output transducer and the microphone; changing the phase of the audio signal served at the output transducer at a given frequency by a predefined amount upon the detection of a possible feedback tone at the given frequency; comparing the frequency of the possible feedback tone before the phase change, to the frequency of the possible feedback tone while the phase of the audio signal is changed by the predetermined amount; determining whether acoustic feedback at the given frequency is present based on a result of the comparing; and changing the phase of the audio signal back to its original value after it is determined whether acoustic feedback is present.

10. The method as claimed in claim 9, wherein the changing the phase of the audio signal includes subjecting the audio signal to an all pass filter in the signal path between the microphone and the output transducer.

11. Method as claimed in claim 10, wherein the all pass filter has a transfer function of the following general foam:

$$H(z) = \frac{a_2 + a_1 z^{-1} + z^{-2}}{1 + a_1 z^{-1} + a_2 z^{-2}}.$$

12. The method as claimed in claim 11, wherein the coefficients $a_1$ and $a_2$ are changed gradually.

13. The method according to claim 10, wherein the all pass filter is a second order all pass filter.

14. The method according to claim 9, further comprising:
determining an amount of phase change necessary to cause an amount of frequency change that is expected if the frequency of the possible feedback tone is causing the acoustic feedback; and
changing the phase by the determined amount of phase change.

15. The method according to claim 9, wherein the phase is changed 180 degrees at the frequency of the detected possible feedback tone.

16. The method according to claim 9, further comprising:
turning on or speeding up results in anti-feedback measurements to counteract the feedback, when it is determined that the change of the phase of the audio signal results in a change in frequency detectable in a comparing unit and indicates that acoustic feedback is present at the given frequency.

* * * * *